United States Patent

[11] 3,595,025

[72] Inventors Karl Stockel
Ottobrunn;
Carl-Helmut Dederra, Ottobrunn; Kuno Dreyer, Munich; Just Sohlemann, Ottobrunn; Michael Kaufman, Neubiberg, all of, Germany
[21] Appl. No. 840,373
[22] Filed July 9, 1969
[45] Patented July 27, 1971
[73] Assignee Messerschmitt-Bolkow Gesellschaft mit beschrankter Haftung
Munich, Germany
[32] Priority July 11, 1968
[33] Germany
[31] P 17 51 691.5

[54] ROCKET ENGINE COMBUSTION CHAMBER
11 Claims, 5 Drawing Figs.
[52] U.S. Cl.................................................. 60/267,
29/157 C, 204/9, 239/127.1
[51] Int. Cl..................................................F02k 11/02,
C23b 7/00, B23p 15/26
[50] Field of Search........................................... 60/260,
267, 39.66; 204/9, 25; 29/157 C; 239/127.1

[56] References Cited
UNITED STATES PATENTS
3,022,230 2/1962 Fialkoff........................ 60/39.66
3,154,914 11/1964 Stockel........................ 60/260
3,467,583 9/1969 Naimer......................... 204/9
3,501,916 3/1970 Butter.......................... 60/267

FOREIGN PATENTS
459,924 1/1937 Great Britain................ 60/260

Primary Examiner—Douglas Hart
Attorney—McGlew and Toren

ABSTRACT: A combustion chamber construction includes an inner wall having longitudinally extending cooling channels defined in the exterior thereof and an outer wall which is bonded to the inner wall by galvanizing, both the inner wall and outer wall are made of a single piece of an oxygen-free copper or equivalent material such as silver or molybdenum. The cooling channels are advantageously cut in accordance with the method of the invention such as by machining and formed with the least wall thickness in the area of the thrust nozzle and with the relatively greatest wall thickness in the area of the discharge of the combustion chamber. The internal wall thickness at the head portion of the combustion chamber is made of medium thickness. After the cooling channels are machined into the inner wall portion the channels are filled with a filler material which is electrically conductive and has a low melting point so that upon galvanizing it is melted out. In some instances an intermediate layer is positioned between an outer relatively thick and strong layer and inner wall of the combustion chamber, and the three layers are galvanized together.

ROCKET ENGINE COMBUSTION CHAMBER

SUMMARY OF THE INVENTION

This invention relates in general to a construction of combustion chambers and a method of making the same and in particular, to a new and useful combustion chamber for a liquid-fueled rocket engine which has an inner wall with a plurality of longitudinally extending cooling channels defined therein and an outer wall covering which is galvanized to the inner wall, and to a method of forming such a combustion chamber.

It is customary to cool liquid-fueled rocket engines by introducing at least one of the propellent components into a feed ring which is connected to a plurality of longitudinally extending cooling ducts which extend along the combustion chamber wall. These propellent components are then collected in a ring adjacent the head portion and fed into the combustion chamber for the combustion process. A rocket engine represents a complex machine which with regard to design requirements for the combustion process and structural strength requires contrary provisions which must be coordinated in order to provide the most effective unit. The rocket combustion process takes place under extreme temperatures and requires a high pressure ratio for the achievement of high efficiency. Since there is no suitable material, including metal, which can withstand the extremely high combustion chamber temperature without protection, care must be taken to ensure that the amount of heat generated is rapidly dissipated. This function is achieved by employing a coolant which flows in association with the combustion chamber walls and for this purpose the walls are provided with cooling passages which may be defined only up to the upper strength limits of the wall in question. Such an upper strength limit in respect to temperature and pressure is soon reached with the known constructions. Thus in combustion chambers made of steel with cast-in or otherwise worked-in cooling ducts and an outer steel jacket welded on as a covering for the latter, the relatively low thermal conductivity of the steel rapidly puts a limit on the temperature increase which may be achieved and thus adversely affects the efficiency of the combustion process. Overheating of the wall material will result in a heat accumulation so that the hot strength of the material will diminish rapidly with the rising combustion chamber temperatures. In order to control the very high temperature, it is already known to make the combustion chamber with a wall which is contacted by a wound tubular, copper cooling fluid coil and the individual coil windings are connected together by copper welding or bronze soldering. There is a great danger with such constructions that the many junctions exposed directly to the combustion chamber temperatures will be thermally overstressed between individual coil turns. It is also known to provide cooling ducts on the outside of the combustion chamber which includes a wall having a plurality of welded or soldered segments and to cover such ducts with a wire winding which are joined by soldering or welding. In such a construction there is a great manufacturing difficulty insofar as it is practically impossible to attach the outer winding or the outer jacket fitting in a manner such that a satisfactory welded or soldered joint exists between all the contact surfaces extending between the inner and outer wall portions. Unless this is done the welded or soldered joints will break up under the combustion chamber loads and the existence of any singular defective joint will soon result in a complete destruction of the combustion chamber.

In addition to the internal pressure of the combustion chamber an effective inner load for the combustion chamber and thrust nozzle wall will result primarily from the pressure difference which exists between the pressure of the injection of the propellent component flowing in the cooling ducts and the inner pressure of the combustion and thrust nozzle. The pressure is reduced from the front to the rear of the combustion chamber and at the location to the rear of the thrust nozzle at the thrust discharge end it is only slightly above ambient pressure. This pressure difference bears on the inner wall of the combustion chamber and the thrust nozzle formed by the body of the combustion chamber in the regions of the webs between the cooling channels so that the individual wall elements are unduly stressed in radial directions. In addition, the joints are stressed by the differential pressures which exist to produce tension stresses between the radially outwardly pointing surfaces of the individual webs between the cooling channels and the exterior wall.

In accordance with the invention the disadvantages of the prior art are overcome by providing a combustion chamber construction which is capable of safely withstanding an extremely high combustion chamber presence or injection pressure as well as extremely high combustion chamber temperatures. This is done by providing a combustion chamber having an inner wall made of a single piece of an oxygen-free copper material, or, of a material approximately equivalent in its properties, such as silver or molybdenum. The exterior of this wall is covered with a cover of a material of similar properties after the cooling channels have been worked into the exterior surface of the inner wall, such as by machining.

In accordance with a further feature of the invention, the wall thickness of the interior wall is varied in accordance with the temperature and pressure conditions which exist during the operation of the combustion chamber. For this purpose the wall is advantageously made the thinnest in the area of thrust nozzle neck and the thickest adjacent the thrust nozzle discharge opening. It is made of medium thickness adjacent the combustion chamber head portion. In this manner the thickness of the interior wall is proportional to the diameter of the unit and changes over its length. "Galvanize" as used herein is intended to mean electroform and electrodeposit.

Accordingly, it is an object of the invention to provide an improved method of forming a combustion chamber which includes forming an interior wall of a single piece of substantially pure oxygen-free copper material or an equivalent material, machining a plurality of longitudinally extending channels in the exterior wall, and covering the exterior of the interior wall by a cover of a similar material by galvanizing the cover to the interior wall.

A further object of the invention is to provide a combustion chamber which includes an interior wall having a plurality of longitudinally extending cooling conduits defined therein and an exterior wall which is formed and bonded to the interior wall by a galvanizing process and where the interior wall is made of variable thickness preferably of a minimum thickness in the nozzle neck portion.

A further object of the invention is to provide a combustion chamber which is simple in design, rugged in construction, and economical to manufacture.

The various features of novelty which characterize the invention are pointed out with particularity in the claims annexed to and forming a part of this specification. For a better understanding of the invention, its operating advantage and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
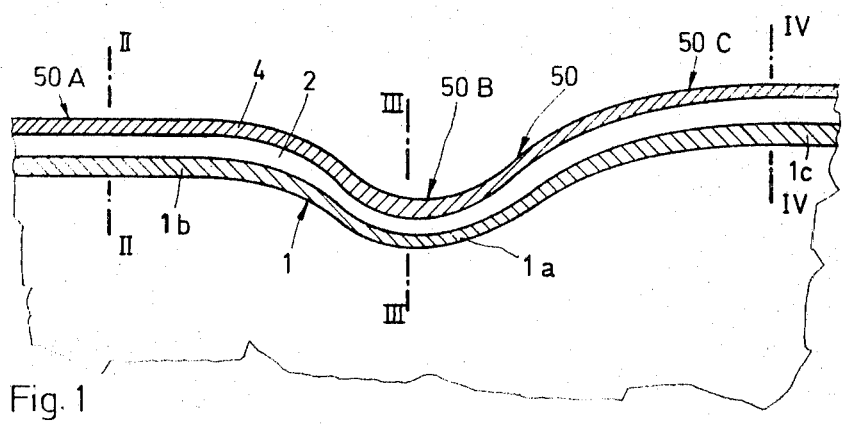
FIG. 1 is a partial longitudinal sectional view of a combustion chamber constructed in accordance with the invention.

Referring to the drawings in particular, the invention embodied therein in FIGS. 1 to 4 comprises a combustion chamber generally designated 5 having a head portion generally designated 50A, a nozzle neck portion generally designated 50B, and a rear portion or nozzle discharge portion generally designated 50C. The combustion chamber unit is made of a basic body or inner wall portion generally designated 1 which is made of an oxygen-free copper or an equivalent material such as a silver or molybdenum. It may be prepared in a traditional manner from a copper block by forging and structurally strengthening, and preferably further machining by chip removal. Cooling channels 2 running in longitudinal direction are machined out of the basic body 1 so that webs remain between the cooling channels 2.

In accordance with the invention the channels 2 are filled with an electrically conductive low melting point substance and an outer jacket or covering 4 preferably made of an oxygen-free copper or similar material is applied over the inner wall 1 and galvanized to it, whereupon the filler material is melted out. This joins the jacket 4 to the inner wall portion 1 safely and rigidly at all points of contact of the webs 3.

Figure 2:
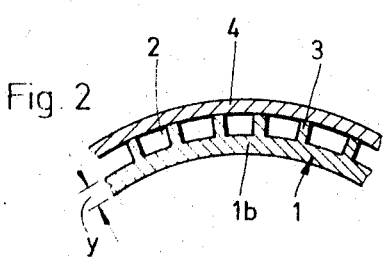
FIG. 2 is a section taken along the line II—II of FIG. 1.
Figure 3:
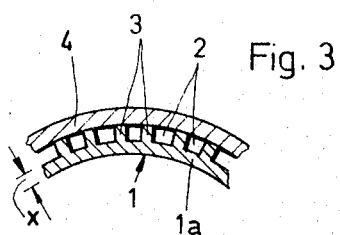
FIG. 3 is a section taken along the line III—III of FIG. 1.
Figure 4:
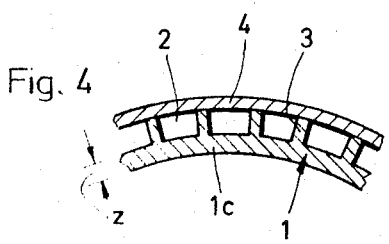
FIG. 4 is a section taken along the line IV—IV of FIG. 1.

During the forming of the cooling channels 2 consideration is given to the operating conditions of pressure temperature which exists along the various portions of the combustion chamber. For this reason the various thickness of the wall portions 1a, 1b and 1c which are indicated in FIGS. 3, 2 and 4, respectively, are varied in accordance with the operating conditions such that the nozzle wall thickness 1a is made the thinnest as indicated by the dimension X in FIG. 3. The discharge wall section 50C and designated 1c is made the thickest as indicated by the dimension Z and the wall thickness of the head portion 50A is made of an intermediate thickness Y as indicated in 1b in FIG. 2. In addition, the cooling channels 2 are of the smallest cross section at the nozzle as indicated in FIG. 3 and at the Y of the widest of the cross section at the discharge end as indicated in FIG. 4, with the cooling channels being of intermediate cross-sectional area as indicated in FIG. 2 for the head portion of the combustion chamber. The width of the cooling channels is relatively the greatest due to the greatest diameter of the unit at the location of the discharge section 50C.

Figure 5:
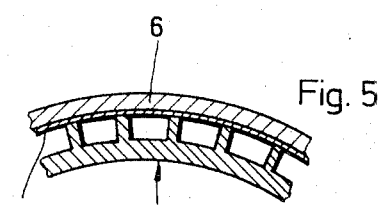
FIG. 5 is a view similar to FIG. 2 of another embodiment of the invention.

In the embodiment indicated in FIG. 5, an intermediate thin-walled layer 5 is galvanized to an outer thick layer 6 and inner wall portion generally designated 1'. The thick-walled cover 6 is made of a nickel or similar material having high strength characteristics in order to absorb the high internal pressure of the combustion chamber. The thin wall intermediate layer is made of an oxygen-free material such as copper which is galvanized to the interior wall 1' in the outer jacket 6.

With the invention there is the guarantee that a safe connection is assured everywhere between the radially outward oriented surfaces of the various webs 3 and the inside of the external combustion chamber and thrust nozzle wall 1. Moreover, the galvanizing process represents in itself a proven, technologically simple and inexpensive method for producing the external wall. The connection reaches an optimum when the external wall is produced, according to the invention, from the same material as the basic body. Another possibility exists in the use of a material of high mechanical strength, such as nickel which simultaneously enters into a sufficiently reliable bond with copper, for galvanizing the external wall.

Especially favorable conditions with regard to maximum heat dissipation, reliable connection of the basic body to to the external wall, and strength are achieved with the following inventive construction of the combustion chamberthrust nozzle unit.

A basic body which consists of oxygen-free copper or an equivalent material such as silver or molybdenum and on which is galvanized a thin-walled, intermediary layer, likewise of oxygen-free copper or an equivalent material such as silver or molybdenum, and a thick-walled pressure jacket of nickel or a similar material with good strength characteristics, galvanized onto said intermediary layer.

The material identity between the basic body and the intermediary layer assures an absolutely reliable connection between these two components at their mutual relatively narrow areas of contact. In addition, the pressure jacket which encloses the intermediary layer in a formfitting manner assures the intermediary layer of a gapless support and, with this, its safe connection to the webs of the basic body.

The oxygen-free copper material guarantees a maximum heat flow between the basic combustion chamber body directly exposed to the fire and the coolant, due to the good heat conductivity of this metal. In addition, oxygen-free copper is virtually insensitive to harmful oxidation phenomena caused by chemically aggressive fuel ingredients during operation and by various manufacturing processes, such as welding and soldering. By galvanizing a reliable connection, not directly exposed to the fire gases, but rather directly cooled by the coolant, is assured at all areas of contact between the cover jacket and the webs of the basic body. In addition, the invention, by the individual wall thickness dimensioning of the cooling channels for the internal combustion chamber and thrust nozzle wall, an optimal construction is achieved in regard to combustion chamber and thrust nozzle stresses, since these wall thicknesses are adapted to the local differential pressures occurring in various magnitudes over the length of the combustion chamber and thrust nozzle. The cause for these differential pressures, differing by zones, is, as already mentioned, that the pressure of the combustion or propelling gases decreases constantly from the combustion chamber up to the thrust nozzle end, until the environmental pressure is reached, whereas the pump pressure of the coolant from the thrust nozzle end to the combustion chamber head decreases relatively little. For this reason, a maximum pressure is exerted against the internal thrust nozzle wall and against the bottom of the various cooling channels in the rear area of the thrust nozzle. This maximum pressure imposes a bending stress on the bottom of the channels. At the greatest diameter of the unit, the width of the cooling channels also reaches a maximum so that the bending load also becomes maximal. This tendency is countered by the invention in advantageous manner, in that here the wall thickness of the cooling channel bottoms is dimensioned the thickest at the greatest diameter portion.

In the area of the nozzle neck, where a medium pressure is applied on the channel bottoms, the latter are made the thinnest in advantageous utilization of the minimum cooling channel width. The inventive minimum wall thickness of the internal thrust nozzle wall and of the cooling channel bottoms in the area of the nozzle neck meets the given conditions advantageously. The thinnest wall thickness is at the hottest zone of the combustion chamber, i.e. at the thrust nozzle portion. The heat dissipation here is increased to its maximum value.

The medium wall thickness of the cooling channel bottoms in the actual combustion chamber zone adjacent the head meets the stresses occurring here best. Here at relatively small differential pressure and high combustion chamber temperature, the width of the cooling channels assumes a medium value.

What I claim is:

1. A combustion chamber construction for a liquid-fueled rocket engine having a thrust nozzle with a discharge opening comprising an inner wall body having a plurality of longitudinally extending cooling channels defined in the exterior thereof which are adapted to be filled with at least one fuel component, said inner wall being made of a single piece of a metal material, and an exterior wall extending around the exterior of said inner wall and being galvanized to said inner wall.

2. A combustion chamber, according to claim 1, wherein said exterior wall comprises oxygen-free copper.

3. A combustion chamber, according to claim 1, wherein said inner wall and said exterior wall consists of one of the following materials: oxygen-free copper, silver, and molybdenum.

4. A combustion chamber, according to claim 1, wherein said exterior wall comprises a nickel material.

5. A combustion chamber, according to claim 1, wherein said cooling channels are of a minimum cross section adjacent said nozzle neck portion and the maximum cross section adjacent said nozzle discharge portion and of intermediate cross-sectional area adjacent said nozzle head portion.

6. A method, according to claim 5, wherein the cooling conduits are filled with a filler material which is electrically conductive and has a low melting point before the galvanizing of the cover to the interior wall.

7. A combustion chamber, according to claim 1, including an intermediate layer galvanized to the interior wall and to the exterior wall and consists of at least one of the following: oxygen-free copper, silver and molybdenum, said exterior wall being a thick-walled pressure jacket of a metal material having high strength characteristic.

8. A combustion chamber, according to claim 1, wherein said thrust nozzle has a neck portion and wherein said cooling channels are formed such that said interior wall has the minimum thickness adjacent the nozzle neck portion and the maximum thickness adjacent the nozzle discharge portion.

9. A method of forming a combustion chamber comprising forming the interior wall of a single piece of at least one of the following materials: copper, molybdenum, and silver, machining a plurality of longitudinally extending cooling channels into the exterior surface of said interior wall, surrounding the interior wall with a cover of a material similar to the interior wall and bonding the cover to the interior wall by galvanizing.

10. The combustion chamber according to claim 1, wherein said metal material comprises oxygen-free copper.

11. A combustion chamber according to claim 1, wherein said exterior wall is a thick-walled pressure jacket of a nickel metal material having a high strength characteristic.